Patented Aug. 2, 1932

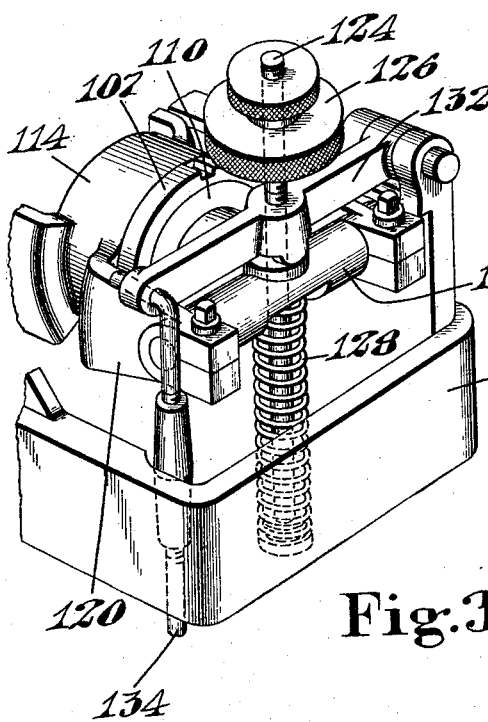
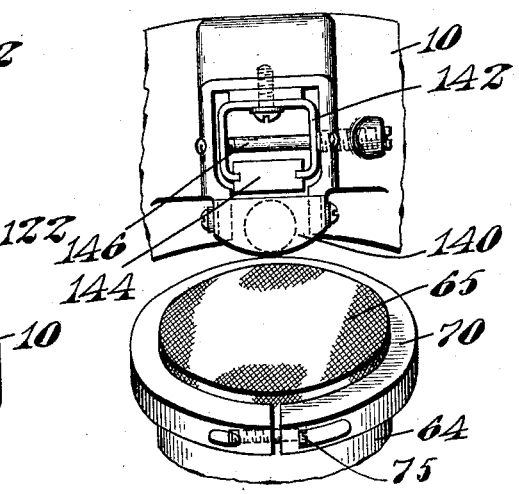
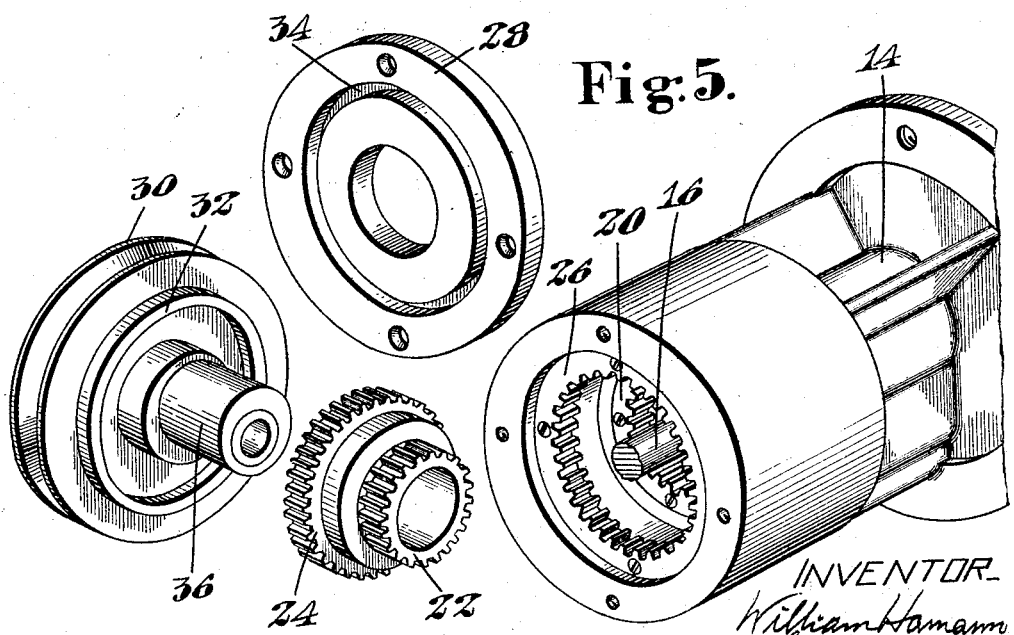

1,869,476

UNITED STATES PATENT OFFICE

WILLIAM HAMANN, OF IRONDEQUOIT, NEW YORK, ASSIGNOR TO UNITED SHOE MACHINERY CORPORATION, OF PATERSON, NEW JERSEY, A CORPORATION OF NEW JERSEY

STITCH INDENTING MACHINE

Application filed December 7, 1928. Serial No. 324,428.

This invention relates to machines for operating on boots and shoes of the type in which the work is presented progressively to the action of an operating tool by a rotary work support.

In one aspect, the invention consists in improvements in the construction and driving mechanism for a rotary work support capable of general application to machines of the character referred to. The invention is herein shown as embodied in a machine for forming indentations or stitch impressions in the extended edges of shoe soles and in this application the invention may be utilized with particular advantage. In another aspect, accordingly, it consists in improvements in stitch indenting machines and particularly those of the type disclosed in U. S Letters Patent No. 1,030,576, granted June 25, 1912 on an application of L. W. G. Flynt.

An important feature of the invention consists in a rotary work support mounted for adjusting movement with respect to a driven operating tool about an axis substantially intersecting the axis of the tool. The work support, in the machine illustrated herein, can also be bodily adjusted toward and away from the tool in order to accommodate work of different thicknesses and to present it to best advantage in operating position. Associated with the rotary work support is a novel form of axially disposed driving mechanism constructed and arranged to maintain its effective driving connection with the work support in all adjusted positions thereof.

In machines of the type in question, the operating tool is usually driven at a high rate of speed whereas, for advancing the work to the tool, the work support is driven at a slow rate. The problem of providing a low speed, accurate and efficient drive for the work support has been solved in accordance with another feature of the present invention by the provision of a spur gear reduction of novel construction. As herein shown, this comprises a self-contained unit arranged to be mounted in the driving train and serving to supply the desired speed reduction between the source of power and the work support.

Other features of the invention, relating more particularly to improvements in stitch indenting machines, consist in improvements in the mounting for the indenting wheel, whereby the balanced condition of the driven parts is improved, smoother running of the machine insured and more convenient provision for adjustment made available than has been found heretofore in machines of this type.

I have discovered that an indenting wheel mounted for free rotation upon a shaft which is itself freely rotatable possesses marked advantages over indenting wheels heretofore known, all of which have developed appreciable rotary inertia in use. This is practically eliminated by mounting both the indenting wheel and its shaft for free rotation. Spinning of the indenting wheel is, therefore, stopped by the lightest contact with the sole and all danger of marring the sole obviated.

These and other features of the invention will be best understood and appreciated from the following description of a preferred embodiment thereof, selected for purposes of illustration and shown in the accompanying drawings, in which Fig. 1 is a view of the machine in perspective with a portion of the frame removed;

Fig. 3 is a view in perspective of the rear portion of the tool holder and associated parts;

Fig. 4 is a fragmentary view, in front elevation, of the machine parts adjacent to the indenting wheel;

Fig. 5 is a view in perspective of the gear reduction unit; and

Fig. 6 is a view in perspective of a portion of a shoe which has been operated upon by the illustrated machine.

Figure 1:
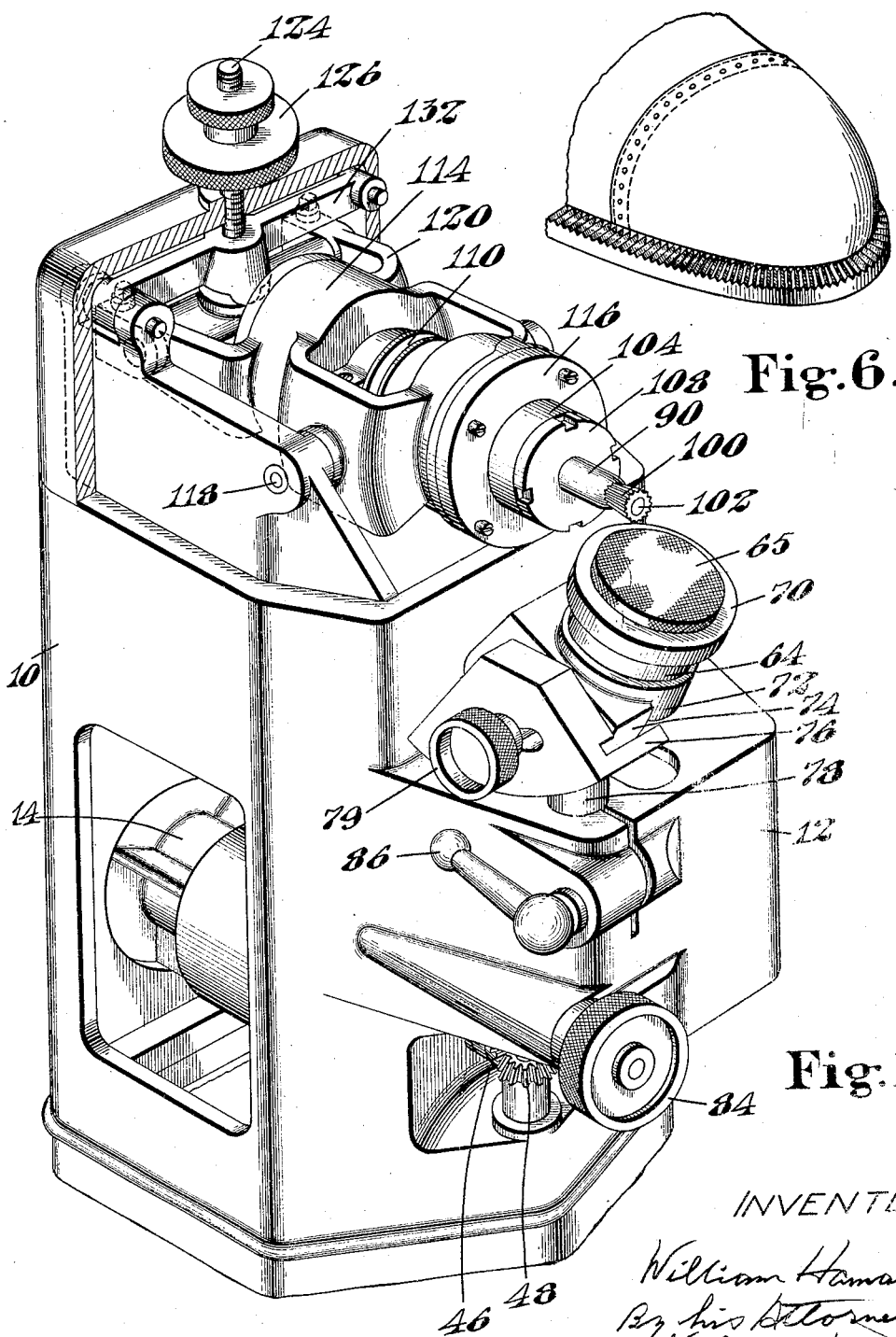

The stitch indenting machine herein shown comprises a rotary work support 64 which is driven slowly in anti-clockwise direction to carry the edge of a sole beneath a stitch indenting wheel 100, mounted to rotate freely on the outer end of a shaft 90, which is given a rapid oscillatory motion in a horizontal plane and also a rapid vertical vibration or series of vertical pressures by mechanism which will be presently described. The result of the operation of the indenting wheel upon the marginal edge of the sole is indicated in the portion of a shoe shown in Fig. 6.

The machine frame 10 encloses the driving mechanism of the machine. It is provided with an outwardly extending projection or casing 12 in which the work support is mounted and, in its upper portion, with a carrier for the operating tool. A source of power, preferably a driven motor shaft, not shown, is contained in the base of the frame and power is transmitted from this to the operating tool and to the work support driving mechanism which includes the self-contained gear reduction unit which will now be described.

Secured to the frame 10 and projecting inwardly therefrom is a flanged housing 14 provided with bearings for a horizontally disposed shaft 16, which will be referred to as the slow speed shaft. The housing is provided with bushings, upon one of which is journaled for free rotation the grooved pulley 30 driven by the belt 33 from the source of power contained in the base of the frame. The pulley 30 is provided with a circular rib 32 upon its inner face which runs in a corresponding groove formed in the outer face of a disk 28 secured to the inner end of the stationary housing 14 and cooperating with the inner face of the pulley 30 to form an oil-tight closure for the housing. The pulley 30 has an eccentric hub 36 upon which is journaled for free rotation a spur gear member, comprising a large gear 24 and a smaller gear 22. The spur gear 24 meshes with a stationary annular gear 26 which is bolted to the housing 14 inside the disk 28. The eccentric hub 36 constitutes a rotatable journal for the gear 24, maintaining it in mesh with the annular gear 26 at one point in the periphery of the latter and in its rotation sweeping the gear 24 around the periphery of the annular gear 26 and thus rotating it upon its journal. The smaller gear 22 meshes with a second annular gear 20, which is secured to the flange of a gear disk 18 which is pinned to the slow speed shaft 16. The small gear 22 meshes with the annular gear 20 at one point in its periphery and is carried about inside this gear by the action of the eccentric hub 36. The gear 22, therefore, drives the annular gear 20 and the slow speed shaft at a greatly reduced rate of speed as compared to the pulley 30. In the gear train herein shown, the fixed annular gear 26 has 48 teeth, the spur gear 24 has 44 teeth, the spur gear 22 has 28 teeth and the annular gear 20 has 32 teeth. The ratio of speed reduction is, therefore, as 22 is to 1.

The housing 14 is provided with an annular oil chamber 40 from which leads a passage 42 to a filling plug 44. By removing this plug, the oil chamber may be filled to the proper level and the whole assembly thus properly lubricated. The slow speed shaft carries at its forward end a bevel gear 46 secured thereto by a set screw. When this gear is disengaged from the shaft 16, the housing 14 with the shaft 16 and the gear train may be removed as a complete self-contained unit and conversely the entire unit may be assembled and secured in place as a unit.

The forwardly projecting portion 12 of the frame is provided with vertical bearings for a stem 78, having at its upper end a head 76 with a circular groove and flange in its inner face having an axis of curvature which substantially intersects the axis of the indenting wheel 100. Mounted in the head 76 is a carrier member 74 which is supported by the flange of the head and has a circular rib which slides in the groove of the head and guides the carrier for angular adjusting movement about an axis which substantially intersects that of the indenting wheel. A binding screw having a knurled head 79 projects from the carrier member 74 through a slot in the head 76 and serves to clamp the carrier member in any position of angular adjustment.

The stem 78 is internally threaded to receive a vertical adjusting screw 80 journaled in the casing 12 and having a worm gear 82 fast thereto. The worm gear 82 meshes with a worm 81 also journaled in the casing 12 and having at its outer end a hand wheel 84, by which the worm may be turned to adjust the head 76 vertically. The casing 12 is split adjacent to the bearing for the stem 78 and a clamping bolt having a handle 86 is provided by which the stem may be clamped in any position of vertical adjustment.

The carrier member 74 is provided with a central journal member having concentric bearings for a drive shaft 62 and having its upper end ball bearings 66 which carry the work support 64. Thrust bearings 68 are also mounted in the carrier member 74 to support the vertical thrust of the work support. The drive shaft 62, at its upper end, is provided with a key which positively engages a slot in the hub of the work support and its lower end with the head 60 of a universal joint. The head 60 is provided with a slot for a sliding block which is pivotally connected to a head 58 carried on the upper end of an intermediate shaft 56 and constituting the second member of the universal joint. The intermediate shaft 56 at its lower end carries a head 54, also having a slot for a sliding block pivotally connected to a head 52 pinned to the upper end of the vertical shaft 50 and constituting a second universal joint. The work support 64 is surrounded by a clamping collar 70 having a clamping screw 75, best shown in Fig. 4. The body of the work support is covered by a covering 65 of textile or rubberized material suitable to maintain at all times a frictional feeding contact with the work. This may be readily replaced by a fresh covering whenever it becomes glazed in use by loosening the clamping collar 70.

The vertical shaft 50 is journaled in bearings in the machine frame and provided with a bevel gear 48 which meshes with the bevel gear 46 fast upon the forward end of the slow speed shaft. These elements, therefore, form a part of the driving train which is interposed between the pulley 30 and the work support 64.

It will be apparent that the mechanism just described will act to drive the work support continuously in all positions of its angular adjustment on account of the universal joints 52—54 and 58—60. The sliding blocks in the heads 52 and 60 also render the mechanism extensible so that effective driving connection is maintained in all positions of vertical adjustment of the work support.

Figure 2:
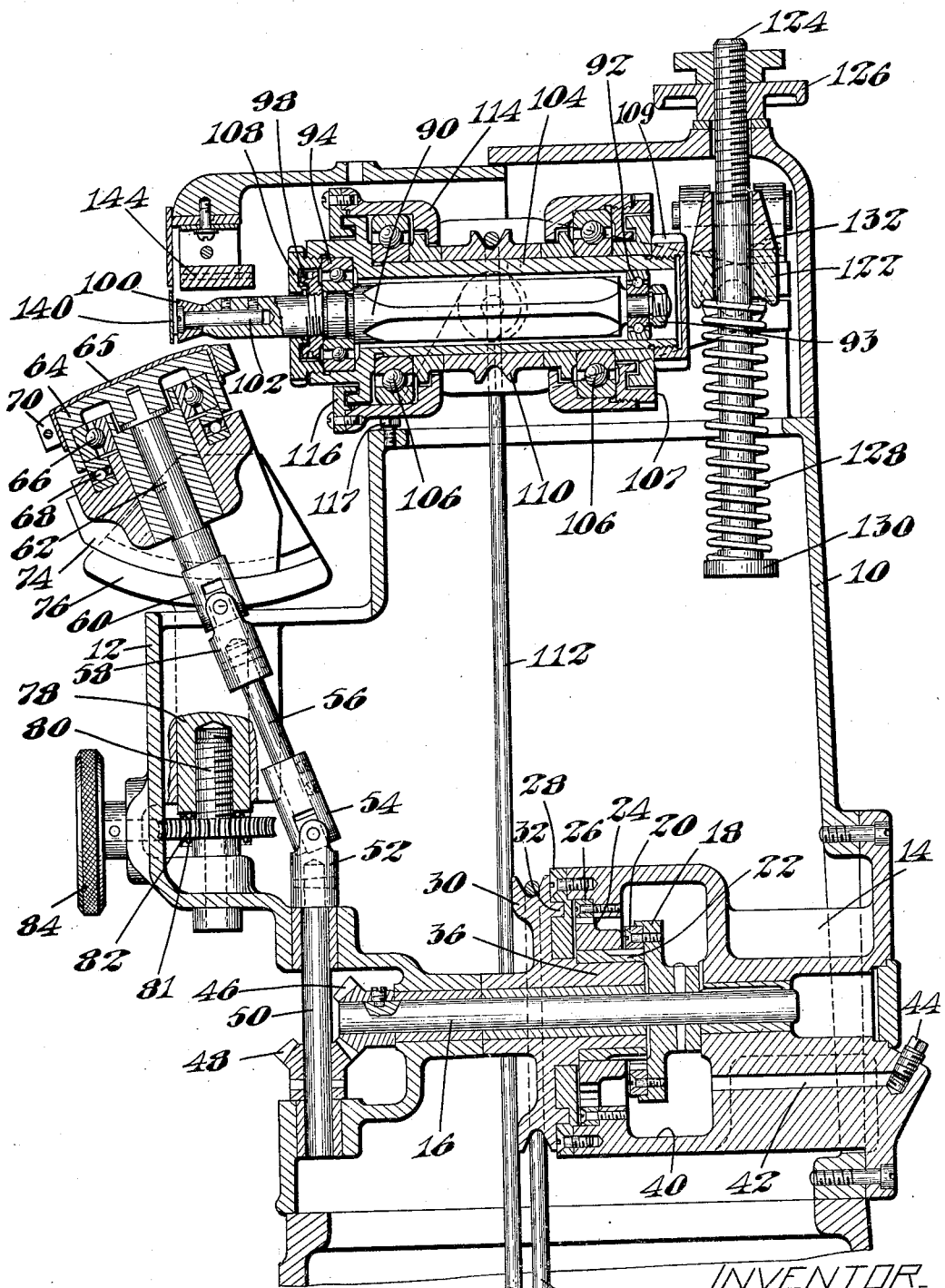
Fig. 2 is a sectional elevation.

The indenting wheel 100 is freely rotatable upon the outer end of a stud 102 projecting from the end of a shaft 90, best shown in Fig. 2. The body of the shaft 90 is fluted in order to reduce the weight thereof and it is mounted to turn freely upon ball bearings 92 and 94 which are mounted within an eccentric sleeve 104. The rear end of the shaft 90 is shouldered and the ball bearings 92 are held in place by a clamping nut 93. Similarly, the ball bearings 94 at the forward end of the shaft are retained in place by a threaded collar 98.

The eccentric sleeve 104 is mounted to rotate freely upon a pair of spaced ball bearings 106 within the carrier member 114. The sleeve 104 is provided at its forward end with an enlarged flanged head, internally threaded to receive a nut 108 and cooperating with a flanged disk 116 to cover the ball bearings 106 in a dust-proof enclosure. Fast upon the surface of the sleeve 104 is a pulley 110 by which the sleeve is rotated at high speed through the medium of a belt 112 extending from the source of power in the base of the machine frame. At its rear end the sleeve 104 is provided with a flanged disk which cooperates with a threaded ring 107 in enclosing the rear ball bearings 106. A check nut 109 is threaded upon the rear end of the sleeve and completes the assembly.

The carrier member 114 is provided with horizontally extending trunnions 118 by which it is supported for vertical oscillation in the machine frame. The oscillating carrier 114 is formed into a yoke at its central portion to provide space for the driving pulley 110 and the belt 112. At its rear end it is provided with a yoke comprising a pair of arms 120 between which extends a transverse shaft carrying a sleeve 122. The sleeve and shaft are perforated to receive a threaded rod 124 which extends upwardly through the frame of the machine and is provided with a knurled nut 126 which is supported upon the upper surface of a boss on the machine frame, as shown in Fig. 2. At its lower end the rod 124 is provided with a head 130, between which and the lower side of the sleeve 122 is located a compression spring 128 which thus tends always to elevate the rear end of the carrier 114 and press the indenting wheel into yielding engagement with the work. Swinging movement of the carrier 114 is limited by an adjustable stop screw 117 set in the machine frame and engaging the lower surface of the carrier. It will be apparent that by turning down the adjusting screw 126 the rod 124 will be elevated and the compression of the spring 128 increased.

Means are provided for swinging the carrier 114 downwardly at its rear end to raise the indenting wheel for the presentation of the work. This comprises a lever 132, pivotally mounted between ears at one side of the machine frame and having a vertical hole which loosely surrounds the rod 124. The lower side of the lever 132 is provided with a pair of curved lugs which engage a boss upon the sleeve 122, while at its outer end it is connected to a vertical treadle rod 134. It will be apparent that by depressing the treadle rod 134 the carrier 114 will be rocked upon its trunnions and the indenting wheel lifted with reference to the work support.

The indenting wheel is provided with a guard, comprising a sheet metal yoke 140 secured to the machine frame and being located adjacent to the end face of the indenting wheel so that it will be interposed between the indenting wheel and the upper of the shoe being operated upon.

For some types of work it is desirable to heat the operating tool and, as herein shown, an electric heating unit comprising a refractory block 144 with resistance wires wound in its surface is located directly above and in close proximity to the indenting wheel. The block 144 is retained in a sheet metal clamp 142 which engages the opposite sides of the block and is provided with a clamping screw 146. The whole assembly of the heating unit is mounted in a recess formed in the machine frame and the indenting wheel is heated by direct radiation from the incandescent wires of the unit.

In the operation of the machine, the eccentric sleeve 104 is rotated under the actuation of the pulley 110 and if there is no work interposed between the indenting wheel 100 and the work support the indenting wheel and its shaft 90 will be caused to travel in a circular path, the diameter of which is equal to twice the eccentricity of the axis of the shaft in the sleeve 104. When, however, work is interposed between the indenting wheel and the work support and the wheel is forced into engagement with the work by the pressure of the spring 128, under these conditions any tendency of the indenting wheel to move vertically is restrained. The movement of the tool and its shaft is, therefore, converted from the circular path into a substantially horizontal movement of the shaft and tool and the vertical component of the eccentric motion is taken up in a vertical oscillation of the carrier 114 upon its trunnions. The result is that the indenting wheel remains in constant engagement with the work under the pressure of the spring 128 and the indenting wheel, accordingly, rolls back and forth over the edge of the sole. It is further to be noted that as an incident to the rapid conversion of the circular travel of the tool and its shaft into horizontal movement, the tool and shaft is given a rapid rocking movement longitudinally of the engaging element of the tool and the indentations formed thereby.

The work support is meanwhile driven in the direction appropriate to carry the edge of the sole progressively beneath the indenting wheel and the indenting operation may progress rapidly from the shank portion of the sole on one side through the forepart and to the shank on the other side. The machine may be readily adapted to handle soles of varying thickness by the vertical adjustment of the work support by the hand wheel 84. The angular position of the work support may also be conveniently adjusted by loosening the clamping screws 79 and in this way the most favorable angular position of the sole with respect to the indenting wheel may be secured.

It will be noted that the indenting wheel 100 is mounted for free rotation upon its journal 102 in the shaft 90 and that the shaft 90 itself is mounted for free rotation upon ball bearings within the sleeve 104. This arrangement of a freely rotating indenting wheel upon a freely rotating shaft has been found particularly desirable in use. Among its other advantages it obviates all danger of the wheel moving at a different rate than the work when in contact therewith and so scuffing or gouging its surface.

While the illustrated machine discloses an operating tool which comprises an indenting wheel, the invention is not limited in its application to this or to any specific type of tool. It would be within the scope of the invention, therefore, to substitute for the indenting wheel tools having other and different functions in the art of shoemaking.

Having thus described my invention, what I claim as new and desire to secure by Letters Patent is:

1. A machine of the class described, having in combination, an operating tool, a co-operating rotary work support angularly adjustable about an axis substantially intersecting the axis of the tool, and axially disposed driving means for said work support constructed and arranged to maintain positive driving connection with the work support in all positions of angular adjustment.

2. A machine of the class described, having in combination, an operating tool, a co-operating rotary work support angularly adjustable about an axis substantially intersecting that of the tool and also bodily adjustable toward and from the tool, and an extensible driving train arranged to maintain driving connection with said support in all positions of its adjustment.

3. A machine of the class described, having in combination, an operating tool, a vertically adjustable head located beneath said tool and having a curved guideway therein, a carrier member angularly adjustable in the guideway of the head, a rotary work support journaled in said carrier member, and a driving train operatively connected to the work support in all positions thereof.

4. A machine of the class described, having in combination, an operating tool, a vertically adjustable head located beneath said tool, a work support mounted for angular adjustment therein, the axis of said tool and the axis about which said work support is adjustable being at the same side of the work support, a driving shaft journaled in stationary bearings remote from said head, and a driving train between said shaft and work support for rotating the latter including a universal joint and an extensible connection.

5. A machine of the class described, having in combination, an operating tool driven at high speed, a cooperating rotary work support arranged to turn at low speed in presenting the work to the action of the tool, and driving means therefor including a housing containing a unitary planetary gear reduction.

6. A machine of the class described, having in combination, a machine frame with a high speed operating tool mounted therein, a rotary work support arranged to turn at low speed in presenting the work to the action of the tool, and driving means including a removable housing having a self-contained unitary spur gear reduction train mounted therein.

7. A machine of the class described, having in combination, a sole indenting tool, a rotary work support, and means for driving said support at a low speed including a pulley having an eccentric hub, a loose gear thereon, a stationary annular gear meshing with said loose gear, and a second annular gear driven by said loose gear and in train with said work support.

8. A machine of the class described, having in combination, an operating tool, a rotary work support, and driving means therefor including a housing having a pulley and a slow speed shaft journaled therein, a planetary gear reduction contained in the housing, removable as a unit therewith and being interposed between said pulley and slow speed shaft, and connections between the latter and said work support.

9. A machine of the class described, having in combination, an operating tool, a rotary work support cooperating therewith and driving mechanism for said work support including a driven pulley, a slow speed shaft, and an interposed planetary spur gear reduction.

10. A sole indenting machine, having in combination, an indenting wheel, a freely rotatable shaft upon which said indenting wheel is mounted for free rotation, and means for oscillating the shaft back and forth while the wheel engages the sole.

11. A sole indenting machine, having in combination, a work support, an indenting wheel, a shaft upon which said indenting wheel is mounted for free rotation, means for oscillating the shaft to cause the indenting wheel to roll back and forth upon the sole, and means for moving said work support to cause the sole to be presented progressively to the action of the wheel.

12. A machine of the class described, having in combination, a shaft, an indenting wheel freely rotatable on said shaft, a carrier rotatably supporting said shaft and mounted to oscillate about an axis transverse to the axis of the tool, and means disposed in line with the axis of the indenting wheel for adjustably controlling the pressure of said wheel upon the work.

13. A machine of the class described, having in combination, a carrier having an indenting tool freely rotatable in one end and a spring acting at all times upon the other end arranged to swing the carrier about a transverse axis, means for causing said carrier to oscillate about said axis in opposition to the action of the spring, and a work support arranged for angular adjustment about an axis substantially intersecting that of the tool.

14. A machine of the class described, having in combination, a carrier mounted for oscillation having a work engaging tool rotatably mounted at one end, a yoke at the other comprising a pair of arms extending in the direction of the tool's axis, a rod fixed in said arms, a spring acting on said rod to cause the tool to engage the work, and means for oscillating the carrier.

15. A machine of the class described, having in combination, a carrier mounted for oscillation, a work engaging tool rotatable about an axis disposed longitudinally of the carrier and projecting from the forward end thereof, a transverse member mounted in the rear end of the carrier, a spring acting upon said transverse member to hold the tool in yielding engagement with the work, and means for oscillating the carrier.

16. A machine of the class described, having in combination, a machine frame, a carrier mounted for oscillation and being enclosed by said frame, an indenting wheel mounted in the forward end of the carrier, a vertically disposed rod connected to the rear end of the carrier and projecting upwardly through the frame, a spring associated with said rod and opposing the oscillation of the carrier, and adjusting means for the spring mounted on said rod outside the frame.

17. A machine for indenting shoe soles, having in combination, a sole support, a freely rotatable shaft, and an indenting wheel freely rotatable upon said shaft.

18. A machine for indenting shoe soles, having in combination, a sole support, an oscillatory carrier, a shaft mounted therein for free rotation, and an indenting wheel mounted on the shaft for independent free rotation.

19. A machine for indenting shoe soles, having in combination, a sole support, a freely rotatable shaft, a freely rotatable indenting wheel mounted thereon, said indenting wheel being normally held in engagement with a sole upon the support, and means for separating said support and indenting wheel for the presentation of a sole.

20. A machine for indenting shoe soles, having in combination, a sole support, a freely rotatable shaft, a freely rotatable indenting wheel mounted thereon, and means for rocking said shaft about a transverse axis to bring the indenting wheel into engagement with a sole upon the support.

21. A machine for indenting shoe soles, having in combination, a sole support, an oscillatory carrier, a shaft mounted in the carrier for free rotation and projecting at one end above the sole support, an indenting wheel mounted for free rotation upon the end of said shaft, treadle operated means for swinging the carrier to lift the indenting wheel away from said sole support, and yielding means for swinging the carrier in the opposite direction until its motion is arrested by the engagement of said freely rotatable indenting wheel with a sole upon the support.

In testimony whereof I have signed my name to this specification.

WILLIAM HAMANN.